US008941967B2

(12) United States Patent
Jones et al.

(10) Patent No.: US 8,941,967 B2
(45) Date of Patent: Jan. 27, 2015

(54) UNDERWATER LASER-GUIDED DISCHARGE

(75) Inventors: Theodore G. Jones, Alexandria, VA (US); Antonio C. Ting, Silver Spring, MD (US); Daniel F. Gordon, Waldorf, MD (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 602 days.

(21) Appl. No.: 13/293,338

(22) Filed: Nov. 10, 2011

(65) Prior Publication Data
US 2012/0114007 A1    May 10, 2012

Related U.S. Application Data

(60) Provisional application No. 61/412,126, filed on Nov. 10, 2010.

(51) Int. Cl.
*H05F 3/00* (2006.01)
*G02F 1/35* (2006.01)

(52) U.S. Cl.
CPC .................................. *G02F 1/3511* (2013.01)
USPC ........................................................ 361/220

(58) Field of Classification Search
CPC .................................. H05F 3/00; G02F 1/3511
USPC .................................................. 361/212, 220
See application file for complete search history.

(56) References Cited

U.S. PATENT DOCUMENTS

| 4,223,279 | A  | * | 9/1980 | Bradford et al. ................. 372/86 |
| 7,260,023 | B2 |   | 8/2007 | Jones et al. |
| 2002/0012376 | A1 | * | 1/2002 | Das et al. ......................... 372/58 |

OTHER PUBLICATIONS

Woodworth et al., "Laser Triggering of Water Switches in Terrawatt-Class Pulse Power Accelerators," Sandia Report, SAND2005-6990 (2005).*
J.R. Woodworth et al., "Laser-Induced Water Triggering," Proc. 14th IEEE International Pulsed Power Conf., Dallas, TX, 595 (2003).
J.R. Woodworth et al., "170-kV Laser-Triggered Water Switch Experiments," IEEE Trans. on Plasma Sci., 33, 2051 (2005).
J.R. Woodworth et al., "Green-Laser-Triggered Water Switching at 1.6 MV," IEEE Trans. on Dielectrics and Insulation 14, 951 (2007).
S. Minardi et al., "Time-resolved refractive index and absorption mapping of light-plasma filaments in water," Optics Lett. 33, 86 (2008).
Zhao et al., "Femtosecond Ultraviolet Laser Pulse Induced Lightning Discharges in Gases," IEEE J. Quant. Electr. 31, 599 (1995).
(Continued)

*Primary Examiner* — Rexford Barnie
*Assistant Examiner* — Ann Hoang
(74) *Attorney, Agent, or Firm* — US Naval Research Laboratory; Joslyn Barritt

(57) ABSTRACT

Methods for producing a laser-guided underwater electrical discharge are provided. One or more electrodes defining a desired electrical discharge path are situated in a body of water and are attached to an external electrical power supply. A high-powered, intense laser beam is fired into the water. The laser beam forms an optical filament in the water, which in turn forms an ionized channel having a much greater conductivity than the surrounding water. An external power supply drives an electrical discharge along the path of the ionized channel due to its greater conductivity.

18 Claims, 6 Drawing Sheets

(56) References Cited

OTHER PUBLICATIONS

Gordon et al., "Streamerless Guided Electric Discharges Triggered by Femtosecond Laser Pulses," Phys. Plasmas 10, 4350 (2003).
Yui et al., "Spectroscopic Analysis of Stimulated Raman Scattering in the Early Stage of Laser-Induced Breakdown in Water," Phys. Rev. Lett. 82, 4110 (1999).
W. Liu, O. Kosareva, I.S. Golubtsov, A. Iwasaki, A. Becker, V.P. Kandidov, and S.L. Chin, "Femtosecond laser pulse filamentation versus optical breakdown in H2O," Applied Physics B 76, 215-229 (2003).

* cited by examiner

UNDERWATER LASER-GUIDED DISCHARGE

CROSS-REFERENCE

This application claims the benefit of priority based on U.S. Provisional Patent Application No. 61/412,126 filed on Nov. 10, 2010, the entirety of which is hereby incorporated by reference into the present application.

TECHNICAL FIELD

The present invention relates to the initiation, guiding, and use of electrical discharges in a laser-generated underwater channel.

BACKGROUND

Both air and water are optical media which are transparent to a range of wavelengths, and through which an intense laser beam can travel many tens of meters. Application of laser beams to such optical media can have many useful effects. For example, short-duration intense laser pulses have been used to generate acoustic pulses in water. See U.S. Pat. No. 7,260,023 to Jones et al., the entirety of which is incorporated by reference into the present application. Laser pulses have also been used to trigger high-voltage water switches, see J. R. Woodworth et al., "Laser-Induced Water Triggering," Proc. 14$^{th}$ IEEE International Pulsed Power Conf, Dallas, Tex., 595 (2003) ("Woodworth I"); J. R. Woodworth et al., "170-kV Laser-Triggered Water Switch Experiments," IEEE Trans. on Plasma Sci., 33, 2051 (2005) ("Woodworth II"); and J. R. Woodworth, et al., "Green-Laser-Triggered Water Switching at 1.6 MV," IEEE Trans. on Dielectrics and Insulation 14, 951 (2007) ("Woodworth III").

Both air and water have nonlinear optical properties when the laser beam is above a threshold power level. For example, both air and water are subject to the Kerr effect, wherein the index of refraction of the optical medium increases upon the application of an electric field associated with an electromagnetic wave such as a laser beam. The result of the Kerr effect acting on a laser beam with a centrally peaked intensity profile is beam self-focusing. This process increases the light intensity, thereby further increasing self-focusing in a self-reinforcing manner.

Both air and water also exhibit photoionization, in which the medium within a high-intensity light source becomes ionized. Various lens focusing configurations have been used to achieve laser intensities necessary for photoionization, such as simple lens focusing at large f/#, a compound lens, see Woodworth II, supra; an axicon, see Woodworth III, supra; or a cylindrical lens. Ionized molecules in an optical media decrease the index of refraction, and for typical centrally-peaked beam intensity profiles, the beam is defocused.

At high light intensity, Kerr-induced self-focusing and ionization-induced defocusing can combine and offset to result in the formation of an optical filament and an associated extended volume of ionized air or water. An optical filament is a light beam which propagates at high intensity and small radius for long distances, beyond the divergence distance normally determined by diffraction. Thus, generation and propagation of an optical filament can provide an improved method of photoionization along an extended conduction path.

The ionized channel associated with an optical filament can serve as a path of relative high conductivity, sufficient to guide an electrical discharge through that optical medium. For example, deionized water has a typical resistivity of 2 MΩ·m, which for a 1 square centimeter cross section column yields a resistance per length of 20 GΩ/m. In contrast, one initial measurement of an underwater filament yielded a filament diameter on the order of 10 µm and ionization fraction of $10^{-4}$, so that the filament resistivity per length was 50 MΩ/m, i.e., the filament was 400 times more conductive than a 1 cm$^2$ conducting path through the surrounding deionized water. See S. Minardi, et al., "Time-resolved refractive index and absorption mapping of light-plasma filaments in water," Optics Lett. 33, 86 (2008).

In addition, for laser-guided atmospheric discharges, the heating and rarefaction of neutral gas surrounding a filament can increase the electron mobility and augment the conductivity of the ionized channel. For example, atmospheric ultra-short pulse laser guided discharges were proposed, and initial experiments reported, as early as 1995. See Zhao, et al., "Femtosecond Ultraviolet Laser Pulse Induced Lightning Discharges in Gases," IEEE J. Quant. Electr. 31, 599 (1995). Demonstration and time-resolved characterization of atmospheric discharges at NRL have been reported in Gordon, et al., "Streamerless Guided Electric Discharges Triggered by Femtosecond Laser Pulses," Phys. Plasmas 10, 4350 (2003). For underwater laser guided discharges, heating-driven rarefaction and conductivity enhancement is even more dramatic, since there is a phase change from liquid to vapor which can correspond to a reduction in density of several orders of magnitude.

The laser-induced change in index of refraction scales with the optical media density, and affects the distance required for optical filament formation. The energy per length required to create an ionized channel also scales with the optical media density, and affects the distance the optical filament propagates before energy depletion.

Lifetimes of laser-generated liquid water plasmas have been reported to be on the order of 20 nanoseconds, based on preliminary measurements of broadband optical emission. See Yui, et al., "Spectroscopic Analysis of Stimulated Raman Scattering in the Early Stage of Laser-Induced Breakdown in Water," Phys. Rev. Lett. 82, 4110 (1999).

Measurements of underwater filament parameters for a variety of conditions, including in laser-generated underwater vapor channels, are presently underway at NRL. Preliminary extended underwater laser propagation experiments at NRL suggest filament propagation up to a few meters in length, corresponding to a large upper limit for guided discharge lengths.

SUMMARY

This summary is intended to introduce, in simplified form, a selection of concepts that are further described in the Detailed Description. This summary is not intended to identify key or essential features of the claimed subject matter, nor is it intended to be used as an aid in determining the scope of the claimed subject matter. Instead, it is merely presented as a brief overview of the subject matter described and claimed herein.

The present invention provides methods for producing a laser-guided underwater electrical discharge.

In accordance with the present invention, a high-powered, intense laser pulse can be fired into a body of water in the direction of a desired electrical discharge path through the water. The laser pulse is configured to generate an optical filament within the laser beam as it travels through the water. The optical filament in turn forms an ionized channel coincident with the optical filament along a desired electrical discharge path, the ionized channel having a much greater conductivity than the surrounding water. When an external power supply provides a driving electrical field, the discharge travels along the path of the ionized channel due to its greater conductivity.

The laser-ionized discharge path can be generated in accordance with the present invention in any one of several ways.

In one embodiment in accordance with the present invention, a high-powered, intense laser pulse is fired into the water along all or part of a desired electrical discharge path. The laser beam forms an optical filament in the water, which in turn directly forms the ionized channel along the desired electrical discharge path. When the external power supply provides a driving electric field, the discharge travels along the path of the ionized channel at water density.

In another embodiment in accordance with the present invention, at time t1, a high-powered laser pulse is fired into the water along a desired electrical discharge path, as in the first embodiment, and forms an optical filament in the water. The optical filament heats a water column coincident with and surrounding the filament, which vaporizes and at time t2>t1, usually within a few tens of microseconds, expands to form a water vapor column along the desired electrical discharge path in which electron mobility, plasma recombination times, and conductivity are much greater than in the surrounding water. At time t3>t2, an external power supply then drives the discharge through the vapor column at vapor density.

In another embodiment in accordance with the present invention, two laser pulses are employed. The first laser pulse, fired at time t1, forms an optical filament along a predefined path which heats a water column and at time t2>t1 forms a vapor column as in the previous embodiment. At time t3>t2, a second laser pulse is fired through the vapor column. This second laser pulse forms a second optical filament through the vapor column which in turn forms an ionized channel in the vapor column, the ionized channel having an even greater conductivity than the vapor column. At time t4>t3, an external power supply drives the discharge through the ionized channel. This embodiment is most promising for guiding an electrical discharge in a conductive underwater environment such as seawater.

In another embodiment in accordance with the present invention, a single laser beam is split into multiple beams, each generating a corresponding optical filament and ionized channel along a predefined path. Voltage is applied from a single electrical power supply, resulting in multiple discharges, each one guided through an ionized channel formed by the split laser beam. In this embodiment, the laser beam can be split into a desired pattern by means of a mask or filter placed in front of the beam, to guide the electrical discharges into a desired pattern. This embodiment has particular utility for lithographic electric discharge micromachining.

In another embodiment of a method for producing an array of underwater laser-guided discharges in accordance with the present invention, an array of multiple laser sources, or a single laser source with a set of beam splitters and steering mirrors, can be used to fire multiple laser pulses into the water along a predefined set of paths to form a corresponding array of ionized channels. An electrical discharge can be fired along each ionized channel to provide an array of electrical discharges in a desired pattern.

In some embodiments, one electrode connected to the external power supply is placed into the water. The laser pulse travels through the electrode such that the electrode forms one end of the desired electrical discharge path, the other end being an object in the water that is struck by the laser beam, for example, a mine in the water. When power from the external power supply is applied to the electrode, the outbound electrical current can travel along the laser-ionized path defined by the laser beam, while the surrounding water can form the return current path to a second electrical contact for the power supply.

In other embodiments, two electrodes can be placed into the water to form the desired discharge path, with both of the electrodes being connected to the power supply. When power from the external power supply is applied across the electrodes, the discharge can travel from one electrode to the other along the laser-ionized path.

The present guided electrical discharge in accordance with the present invention can also be used in many underwater fabrication and processing fields, as a replacement for processes such as rastered electric discharge machining and underwater femtosecond laser ablation. Underwater laser-guided electrical discharge has the potential to combine the best features of both of these existing processes: the precision and small feature machining capability of femtosecond laser ablation and the fast etch rate and machining speed of electric discharge machining.

DETAILED DESCRIPTION

Figure 1:
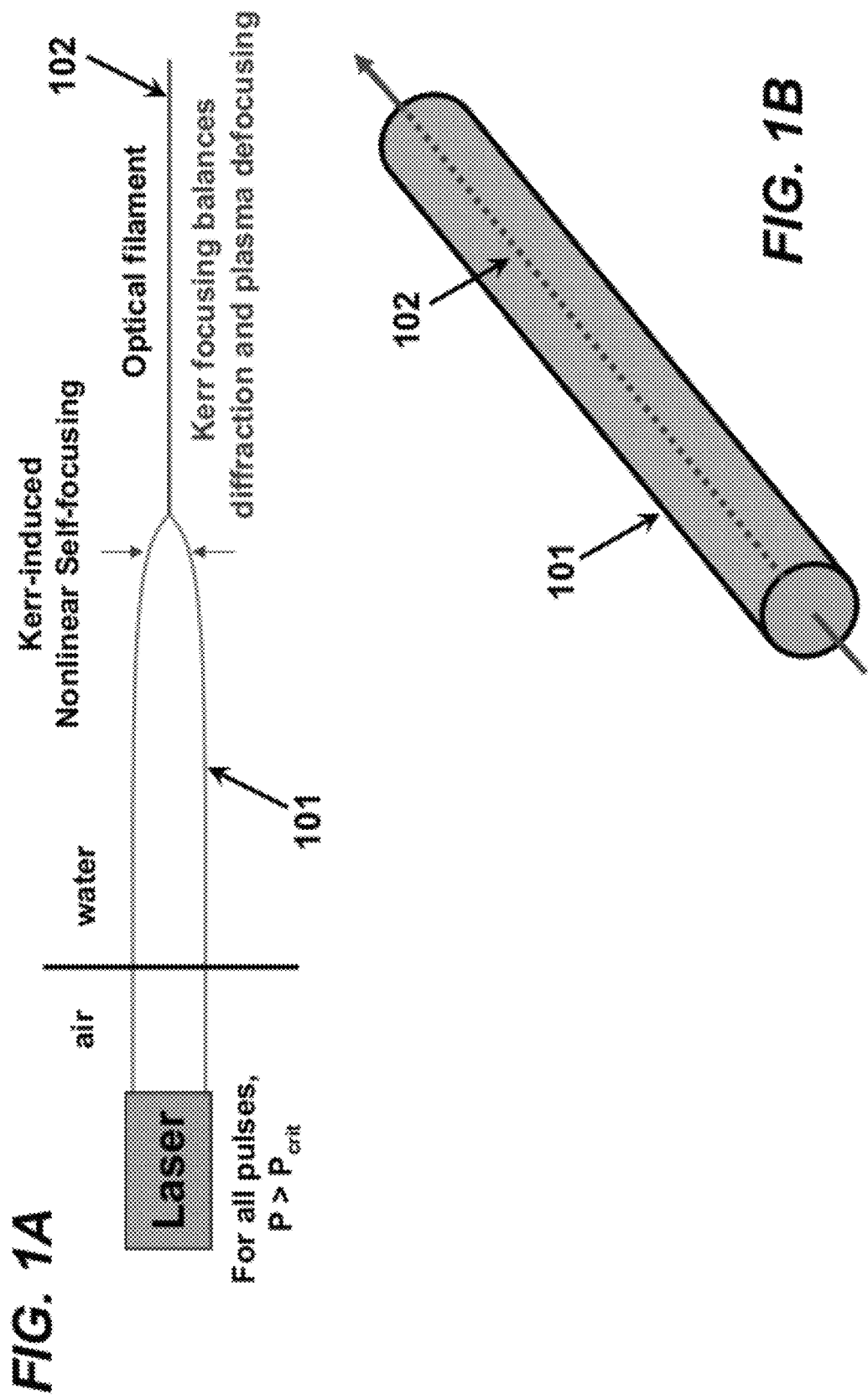
FIGS. 1A and 1B illustrate aspects of an underwater laser beam path within which an optical filament forms, as used in the present invention.

The aspects and features of the present invention summarized above can be embodied in various forms. The following description shows, by way of illustration, combinations and configurations in which the aspects and features can be put into practice. It is understood that the described aspects, features, and/or embodiments are merely examples, and that one skilled in the art may utilize other aspects, features, and/or embodiments or make structural and functional modifications without departing from the scope of the present disclosure.

For example, although the present invention is described herein the context of a laser-guided discharge in a body of water, one skilled in the art would readily appreciate that the methods described herein can be used to generate a laser-guided discharge in any appropriate liquid, and any such methods are deemed to be within the scope and spirit of the present invention.

The present invention provides methods for generating a laser-guided underwater electrical discharge.

The method for generating a laser-guided underwater electrical discharge in accordance with the present invention utilizes an intense laser pulse propagating underwater to create a path that has relative high conductivity in comparison to the surrounding water. Three mechanisms can separately, or in combination, generate such a high conductivity path underwater: (1) laser photoionization of a column of liquid water, (2) laser heating of a column of water, sufficient to generate a vapor column, and (3) laser photoionization of a column of water vapor in a previously generated underwater vapor column. The path can take the form of a laser-ionized channel in liquid water, a laser-generated underwater vapor channel, a laser-ionized channel within an underwater vapor channel, or any combination of these.

As noted above, although it can be possible to achieve the laser intensities necessary to obtain a photoionized channel in water through the use of one or more lens configurations, in accordance with the present invention, configuring the laser pulse to generate and propagate an optical filament in the water provides a simpler method of photoionization along an extended conduction path.

Thus, in accordance with the present invention, a high-powered, intense laser pulse can be fired into a body of water in the direction of a desired electrical discharge path through the water. The laser can be fired directly into the water, for example, from an elevated platform into an open body of water, or can be fired into a contained body of water, for example, through a window in the container. The laser pulse is configured to generate an optical filament within the laser beam as it travels through the water. The optical filament in turn forms an ionized channel coincident with the optical filament, along a desired electrical discharge path, the ionized channel having a much greater conductivity than the surrounding water. When an external power supply provides a driving electrical field, the discharge travels along the path of the ionized channel due to its greater conductivity.

In some embodiments, one electrode connected to the external power supply is placed into the water. The laser pulse travels through the electrode such that the electrode forms one end of the desired electrical discharge path, the other end being an object that is struck by the laser beam, for example, a mine in the water. When power from the external power supply is applied to the electrode, the outbound electrical current can travel along the laser-ionized path defined by the laser beam, while the surrounding water can form the return current path to a second, larger underwater contact connected to the power supply. It should be noted that the laser pulse need not travel directly through the electrode; a beam passing near the electrode or grazing its edge can also form a discharge path in accordance with the method of the present invention and thus guide the discharge.

In other embodiments, two electrodes can be placed into the water to form the desired discharge path, with both of the electrodes being connected to the power supply. When power from the external power supply is applied to the electrodes, the discharge can travel from one electrode to the other along the laser-ionized path.

FIGS. 1A and 1B illustrate the principles of formation of an ionized channel used in the methods of the present invention. In accordance with the present invention, a laser pulse above a critical power level $P_{crit}$ will form one or more intense optical filaments along its path due to a combination of nonlinear self-focusing (i.e., the Kerr effect) and ionization-induced defocusing. The critical power level depends on the optical properties of the medium, particularly its second-order electric field-dependent nonlinear index of refraction, $n_2$, and the wavelength $\lambda$, of the applied laser pulse:

$$P_{crit} = \frac{\lambda^2}{2\pi n_0 n_2}$$

where $n_0$ is the field-independent index of refraction of the material. Both $n_2$ and $n_0$ are specific to the optical medium and are different, for example, for liquid water and water vapor. For liquid water, $P_{crit} \approx 1$ MW, and thus a laser pulse having a power greater than 1 MW can create one or more optical filaments 102 within the original beam 101 defined by the laser pulse propagation path. Initial measurements at NRL indicate underwater filament diameters are on the order of 100 µm, with propagation lengths up to several meters for both femtosecond and nanosecond laser pulse durations. Optical filament diameters are typically much smaller than the original beam formed by the laser pulse, and a key hallmark is their extended propagation at diameters less than would be predicted by diffractive beam divergence.

The optical filament 102 formed by the laser pulse coincides with a partially ionized water column formed by photoionization of the water as the intensified portion of the laser pulse passes through. The fraction of the water that is ionized is greatest within the optical filament, and decreases with the distance from the optical filament axis. This ionized channel contains free electrons and/or ions, and therefore forms a high-conductivity path for an electrical discharge. Because the conductivity of the ionized channel created by the optical filament is much greater than that of the surrounding medium, an electrical discharge can be directed along that path. This underwater laser-guided electrical discharge can be used for many applications, such as advanced micromachining, laser nanoparticle generation, laser-guided discharge shock peening for surface hardening, and low jitter low-inductance pulsed power switching.

For example, a 4 microJoule (µJ), 800 nm wavelength laser pulse with 120 femtoseconds (fs) duration has been reported to form an optical filament having a diameter $\approx 10$ µm in water. See S. Minardi, supra. The ionized channel formed along the optical filament has a conductivity $$\sigma = \frac{1}{\rho} = \frac{ne^2 \tau_{e-n}^{coll}}{m_e}$$

where n is the electron density, e is the charge on an electron, $m_e$ is the electron mass, and $\tau_{e-n}^{coll}$ is the electron-neutral particle collision time, which dominates electron motion in a fluid within an electric field. These parameters produce a resistance per unit length in the ionized channel, R/L=50 megaohm per meter (MΩ/m). In contrast, the resistivity $\rho$ of deionized water is approximately 2 MΩ·m, which for a water column having a cross-sectional area of 1 cm² yields a resistance per unit length R/L=20 gigaohm per meter (GΩ/m), or nearly 400 times greater resistivity than that of the ionized channel formed when the laser is fired into the water.

Figure 2:
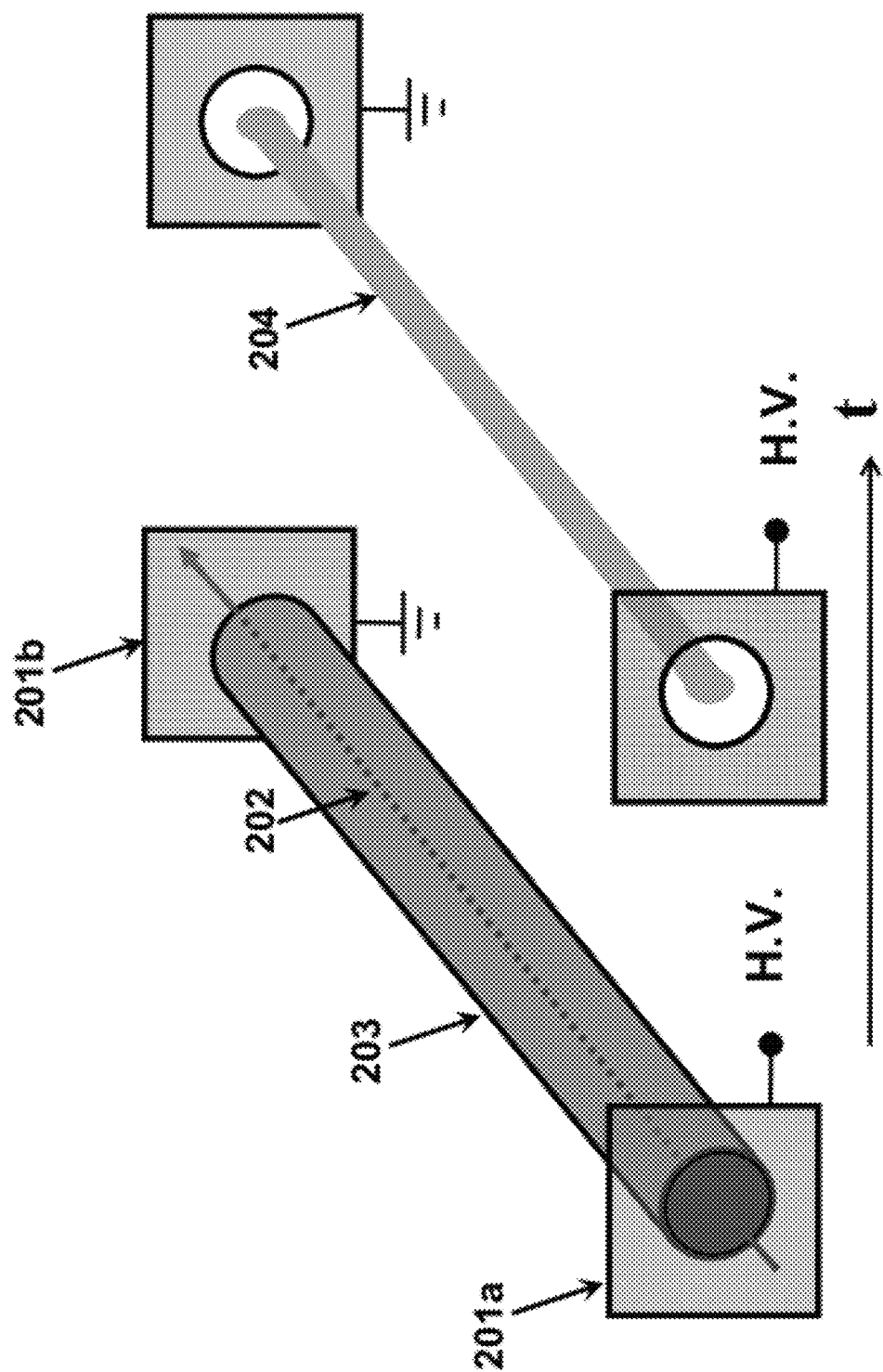
FIG. 2 illustrates aspects of a first embodiment of a method for forming a laser-guided underwater electrical discharge along an ionized optical filament path in accordance with the present invention.
Figure 3:
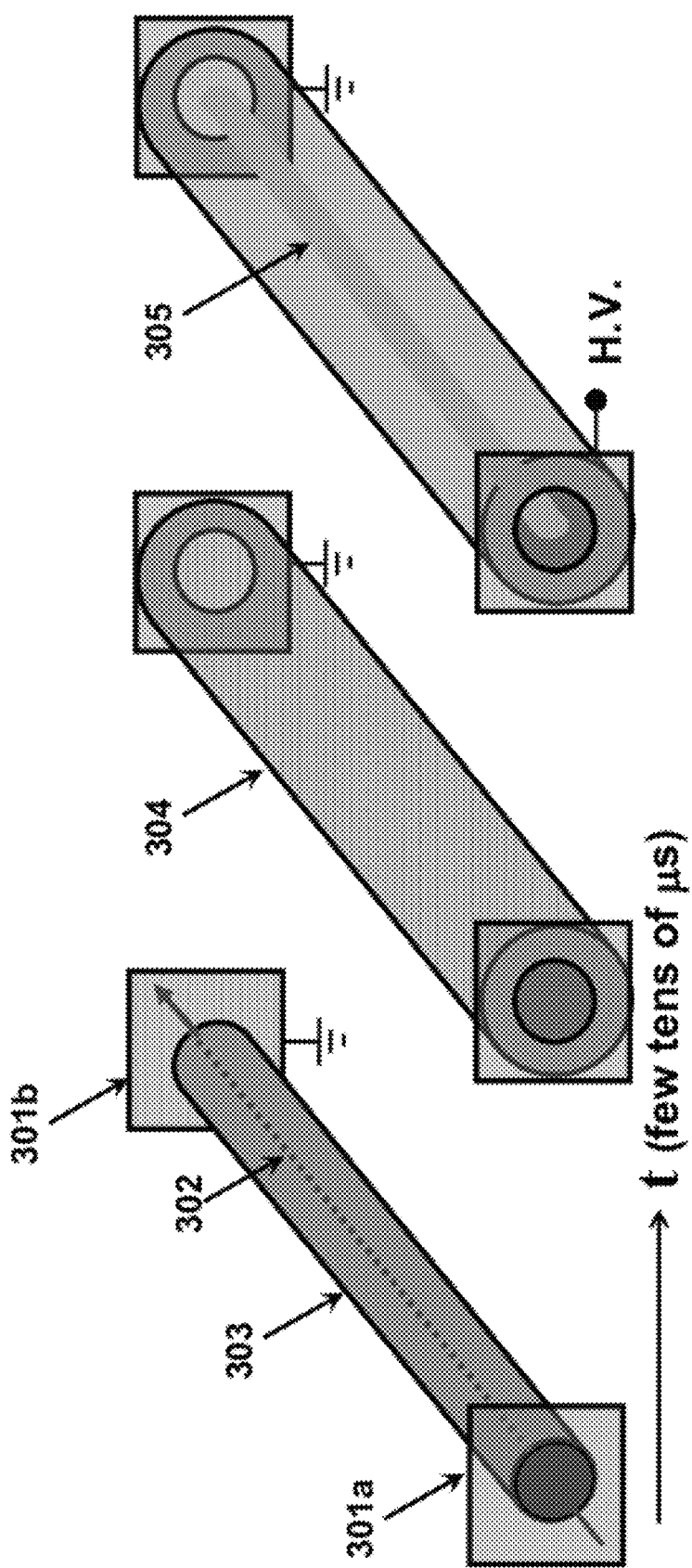
FIG. 3 illustrates aspects of a second embodiment of a method for forming a laser-guided underwater electrical discharge in a laser-generated vapor channel in accordance with the present invention.
Figure 4:
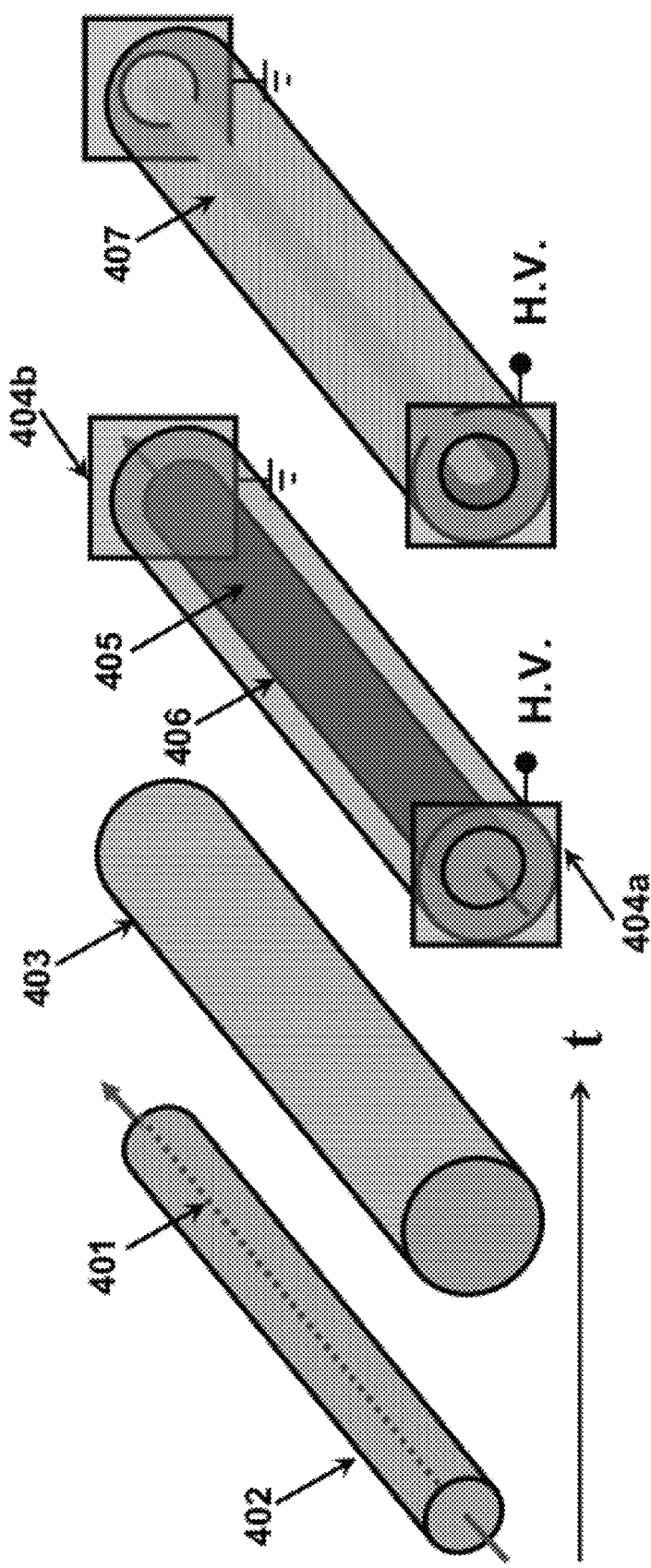
FIG. 4 illustrates aspects of a third embodiment of a method for forming a laser-guided underwater electrical discharge in accordance with the present invention, wherein an initial laser pulse generates a vapor channel and a second laser pulse generates an ionized optical filament path within the vapor channel.

FIGS. 2 through 4 illustrate some exemplary embodiments of a laser-guided electrical discharge in accordance with the present invention. In all the embodiments described below, an external electrical power supply, which in many cases can be pulsed and high voltage, can drive the electrical discharge through the laser-generated current path through a body of water. Thus, at one or both ends of the desired electrical discharge path, electrodes connected to a pulsed power supply can be placed. If two electrodes are used, the discharge can travel from one electrode to the other along the laser-ionized path. If only one high voltage electrode is employed, the outbound electrical current can travel along the laser-ionized path, while the surrounding water can form the return current path to a second electrical contact connected the power supply.

FIG. 2 illustrates aspects of a first exemplary embodiment of a laser-guided discharge in accordance with the present invention. In the exemplary embodiment shown in FIG. 2, at time t1 an intense underwater laser pulse 203 is fired through or near a high-voltage electrode 201a towards electrode 201b along a desired electrical discharge path defined by high-voltage source 201a and electrode 201b. The laser pulse is fired with power P>P$_{crit}$ and consequently, as described above, Kerr self-focusing of the laser beam results in generation of an optical filament 202 within the path of the laser beam and formation of a corresponding ionized channel through the water during propagation of the laser pulse. As described above, the ionized channel has a much higher conductivity than the surrounding water. At time t2>t1, high voltage source 201a can then drive an electrical discharge 204, and this discharge is guided to electrode 201b along the high-conductivity path formed by ionized channel 202. Electrical discharge 204 is initially at water density, although, as described below, subsequent ohmic heating by the discharge may vaporize the discharge channel, thus further increasing its conductivity.

FIG. 3 illustrates aspects of such an additional exemplary embodiment of a laser-guided electrical discharge in accordance with the present invention. In this embodiment, as described below, the electrical discharge travels through a laser-generated water vapor column rather than an ionized water column as in the previously described embodiment. Thus, as illustrated in FIG. 3, at time t1 a high-power laser pulse having P>P$_{crit}$(water) can be fired from high-voltage source 301a which is in the water along a desired electrical discharge path towards a second electrode 301b which also is in the water. As described above with respect to FIGS. 1 and 2, the high-powered laser pulse generates one or more optical filaments and ionized channels 302 within the path of the laser beam 303. The concentrated laser energy in the optical filament plus the high kinetic and potential recombination energy of the ions and electrons within the optical filament heat the water, so that the ionized channel 302 later recombines and thermalizes to form a superheated water channel. The water molecules in this superheated channel expand on a hydrodynamic time scale, which can be a few tens of microseconds or longer depending on energy deposition density, and at time t2>t1 form a water vapor column 304 between the high-voltage power source 301a and the second electrode 301b. For example, assuming laser energy deposition sufficient to vaporize and heat a 10 micron radius water column to 10 bar, vapor column 304 can be formed within about 10 microseconds to a final radius of about 42 microns. Once water vapor column 304 is formed, at time t3>t2, high voltage source 301a can drive an electrical discharge 305 through the water vapor column 304 at vapor density. Because of the relatively low density in water vapor column 304 compared to either the ionized water channel 302 or the surrounding water, the "mean free path" between collisions, electron mobility, recombination times, and finally, the conductivity in water vapor column 304 can be much greater than the surrounding water, and therefore, water vapor column 304 can provide a path of relative high conductivity for guiding of an electrical discharge.

FIG. 4 illustrates aspects of a further exemplary embodiment of a laser-guided electrical discharge in accordance with the present invention. This embodiment is particularly suited for laser-guided discharges in seawater, where the conductivity is higher than in fresh water, due to the presence of dissolved salts.

In the embodiment illustrated in FIG. 4, two laser pulses are employed. The first laser pulse 402 fired at time t1 generates an optical filament and ionized channel 401 in the water in the same manner as described above with respect to FIGS. 2 and 3. The ionized channel creates a water vapor column 403 at time t2>t1 by means of heating and hydrodynamic expansion in the same manner as described above with respect to FIG. 3. After the water vapor column is formed, at time t3>t2 a second laser pulse 406 having a power P>P$_{crit}$ (vapor), either from the same or from a different laser source, is fired into the vapor column to form an optical filament and ionized channel 405 at vapor density. Because the nonlinear index of refraction $n_2$ of the water vapor scales with density, it is much is less than the nonlinear index of refraction $n_2$ of the water, and therefore $$P_{crit} = \frac{\lambda^2}{2\pi n_0 n_2}$$

is much greater for generation of an optical filament in the vapor column than in the water, i.e. P$_{crit}$(vapor)>>P$_{crit}$(water). As a result, the second laser pulse will typically have much higher power than the first laser pulse. If the second laser pulse 406 has sufficient power, then, as shown in FIG. 4, it can form one or more optical filaments and coincident ionized channels 405 within the water vapor column, in a similar manner as the first ionized channel 401 was formed in the water. For example, a first laser pulse at 532 nm wavelength, with a power $P_1$ of 10 MW, can form a filament in water, where P$_{crit}$(water)~2 MW. After waiting for heating by the first pulse and subsequent vapor channel formation, e.g. for a few tens of μs or longer, a second laser pulse at 400 nm, with a power $P_2$ of 50 GW can form a filament in water vapor at atmospheric density, which is expected to have P$_{crit}$(vapor) similar to that for air at standard density (3 GW). The ionized channel 405 forms a path of relative high conductivity in the vapor channel, so that a at time t4>t3 high-voltage source 404a can drive electrical discharge 407 through the vapor-density ionized channel to electrode 404b. Because of the low density of the vapor, ionized channel 405 has a longer mean free path between collisions, higher electron mobility and recombination times, and as a result, higher conductivity than an optical filament-generated ionized channel at liquid density, as well as the surrounding laser-generated vapor channel.

In addition, an underwater laser-guided electrical discharge in accordance with the present invention has the potential to combine the best features of two existing micromachining processes: the precision and small feature machining capability of femtosecond laser ablation, and the high etch rate and machining speed of wire-guided electric discharge machining Such a high etch rate, small feature size technique could be used to improve the manufacture of many microelectromechanical systems (MEMS) devices such as compact undersea weapon guidance systems.

The present invention also can be used to produce multiple laser-generated underwater current channels. In some cases such multiple channels can be generated with one laser source using beam-splitting and beam directing optics, for example, a mask having the desired pattern placed in the beam path, while in other cases multiple lasers can be used.

Figure 5:
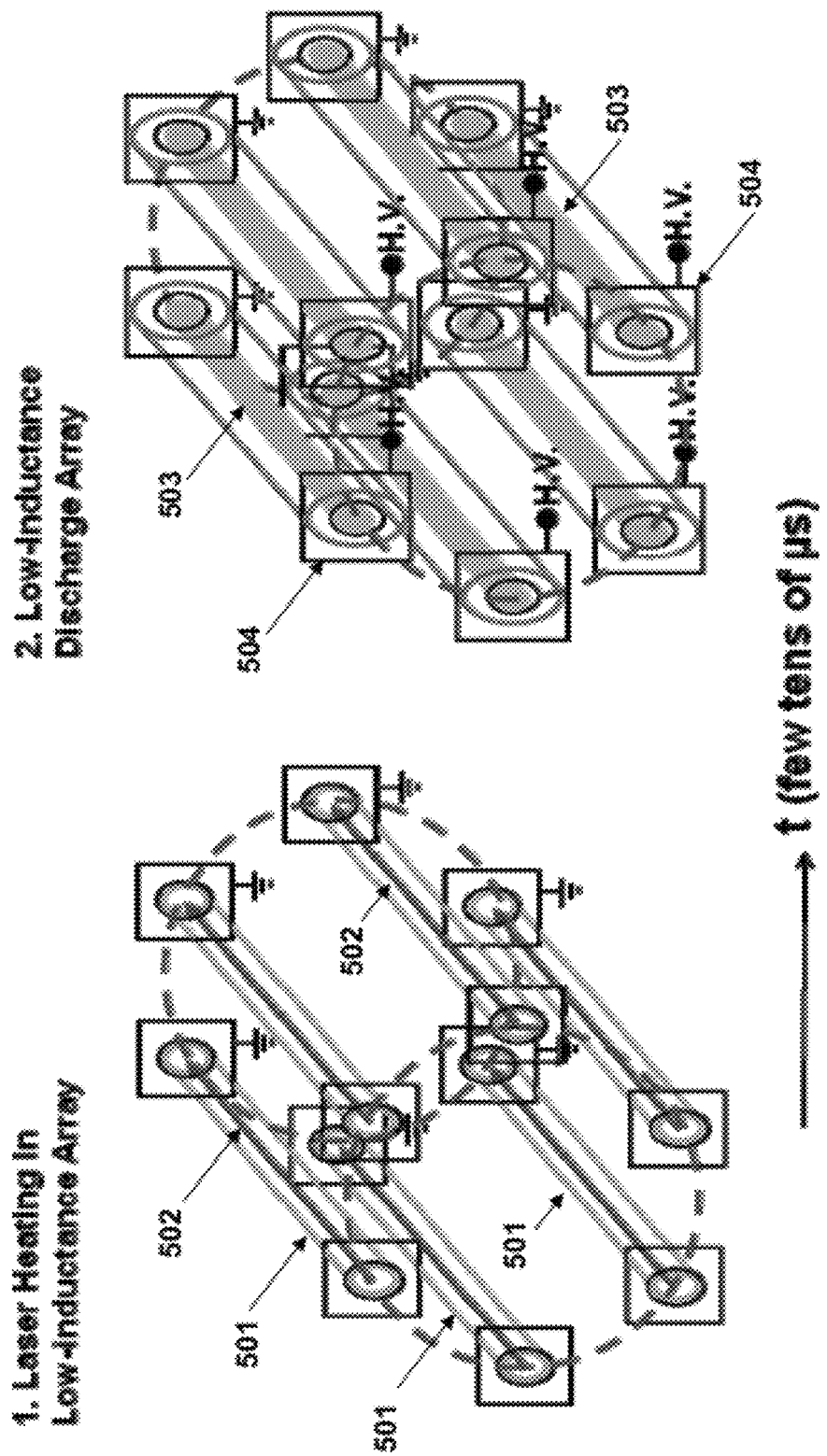
FIG. 5 illustrates an exemplary embodiment of an apparatus for generating a low-inductance, high-conductivity array of electrical discharge paths in water for pulsed-power electrical switching in accordance with the present invention.

FIG. 5 illustrates an exemplary embodiment of such multiple channel formation, in which an array of appropriately distributed current paths in the water is formed by creating several parallel ionized water or vapor columns using simultaneous laser pulses.

Thus, as shown in FIG. 5 an array of laser sources can simultaneously fire high-powered laser pulses 501 into the water which, as described above, can form a corresponding array of ionized channels 502. The array of ionized channels can then form an array of paths for electrical discharges 503 fired from a plurality of electrodes 504 connected to a high-voltage source. As with the use of a mask to diffract a single beam into a desired pattern, the array of multiple laser sources and the corresponding array of electrical discharges can be arranged in a desired pattern. Such a high-conductivity low-inductance configuration can be used as a high-power pulsed power switch for large generators such as the Z Machine at Sandia National Laboratory (see Woodworth I, supra).

Because there are several parallel conduction paths, the total inductance of the array is greatly reduced, and therefore the rate of current rise $$\frac{dI}{dt} = \frac{V}{L}$$

for a given drive voltage is greatly increased, where V is applied voltage and L is the total current channel array inductance, and so the generation of multiple channels in accordance with this embodiment of the present invention can result in a current configuration with both higher total conductance than a channel generated by a single filament and lower overall inductance than that of a single current channel with the same conductivity and total cross sectional area.

Another way to achieve multiple filaments (not shown) is to use a single high-power laser beam with $P/P_{crit}$ much greater than 1, where P is the average beam power and $P_{crit}$ is the threshold power for Kerr effect. Such a beam will naturally form several optical filaments after propagation, via the beam filamentation instability. An embodiment with multiple conduction paths and low impedance is especially useful for high power pulsed power switching.

It may also be desirable to have multiple laser-guided electrical discharge paths for several other applications. For example, the formation of multiple laser-guided electrical discharge paths in accordance with the present invention can be used to imprint a desired etching pattern on a workpiece through lithographic techniques. The multiple paths can be generated in several ways. In an exemplary embodiment illustrated in FIGS. 6A and 6B, a patterned mask such as a wire mesh can be placed in front of a laser beam such that when the beam passes through the mesh, it diffracts and generates multiple optical filaments in a predetermined pattern. See Schroeder, et al., "From Random to Controlled Small-scale Filamentation in Water," *Optics Express* 12, 4768 (2004).

Figure 6A:
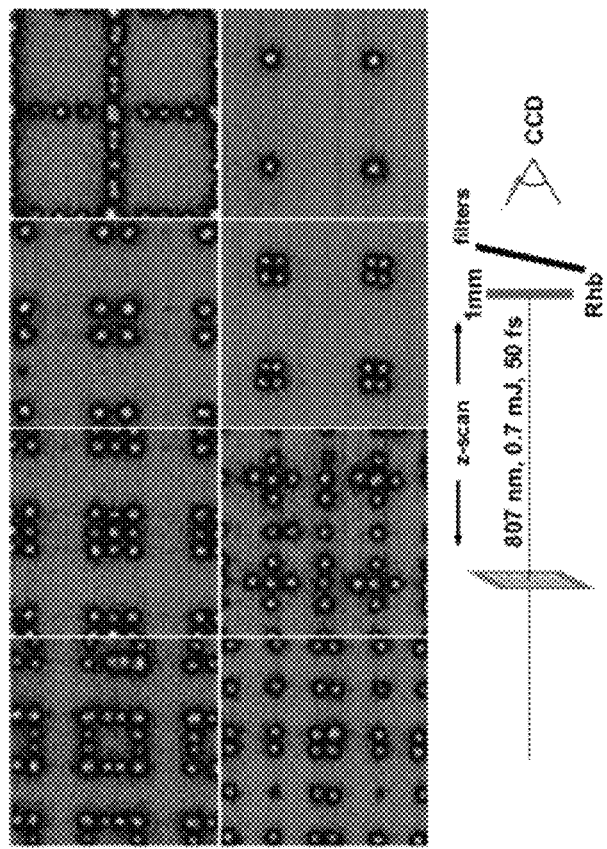
FIGS. 6A and 6B illustrate exemplary lithographically generated patterns of underwater optical filaments, which can be used for controlled laser-guided discharge machining in water in accordance with the present invention.
Figure 6B:
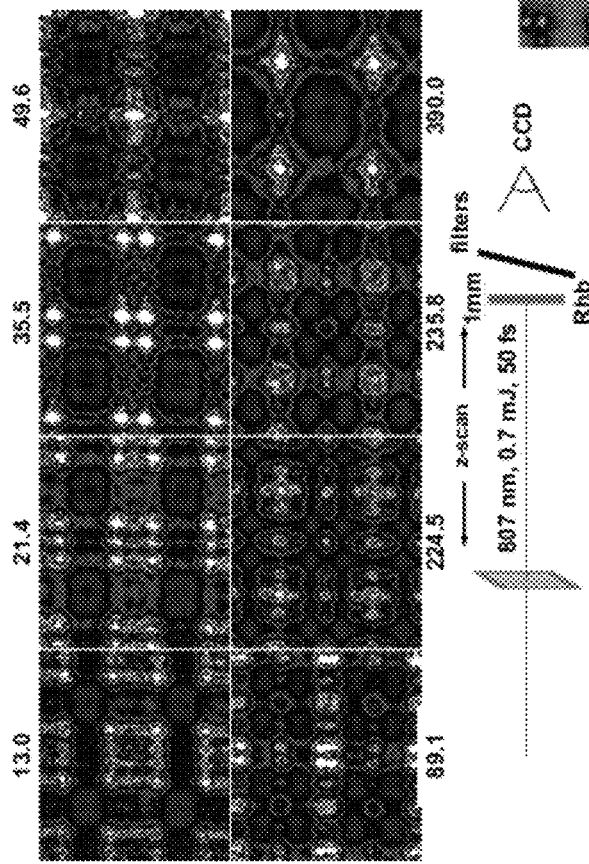

For example, FIGS. 6A and 6B show cross section images of a femtosecond laser beam that has passed through a wire mesh and diffracts as it propagates underwater, demonstrating that the laser beam can be diffracted into a desired pattern. FIG. 6A shows two photon fluorescence of a dissolved dye, and FIG. 6B shows supercontinuum white light, each imaged by a CCD camera. Both types of light emission indicate high laser intensity, and the two corresponding beam pattern images correlate well with each other. With suitable choice of laser power, each high intensity beamlet of the diffracted laser beam can generate its own optical filament and ionized channel. When a high voltage power supply is fired and corresponding electric field simultaneously applied along all ionized channels, current can then travel along the thus-created multiple ionized channels to etch a desired pattern on the workpiece.

An underwater laser-guided electric discharge in accordance with the present invention also can be used in shock processing and in nanoparticle generation. Laser shock peening for surface hardening is presently limited to the maximum average power available in industrial pulsed laser systems, whereas a laser guided electrical discharge shock peening technique can take advantage of much greater average power available in pulsed electrical power supplies. Nanoparticle generation for medical imaging and therapy use using underwater laser-guided electric discharge could benefit by enabling access to new parameter regimes of ablation energy and ablation rate compared to convention underwater laser ablation techniques.

Thus, by using lasers to define an underwater discharge path, the present invention enables much greater flexibility of physical configuration than conventional wire-guided discharges, as well the capability to generate several discharges in rapid succession, each with precise predetermined timing. The present invention includes several important innovations and additional conductivity enhancement techniques, including photoionization of liquid and vapor water, and intense underwater laser propagation including the formation of optical filaments. This invention also introduces the possible use of multiple laser pulses, either in sequence, allowing for expansion into a vapor channel and subsequent vapor ionization, or simultaneously, producing a low inductance, high conductivity array of current paths.

Although particular embodiments, aspects, and features have been described and illustrated, it should be noted that the invention described herein is not limited to only those embodiments, aspects, and features. It should be readily appreciated that modifications may be made by persons skilled in the art, and the present application contemplates any and all modifications within the spirit and scope of the underlying invention described and claimed herein. Such embodiments are also contemplated to be within the scope and spirit of the present disclosure.

What is claimed is:

1. A method for producing a laser-guided underwater electrical discharge, comprising:

at time t1, firing a laser pulse having a power P greater than a critical power $P_{crit}$ past a first electrode in a body of water, the electrode being connected to an external power supply, the power P and a focusing of the laser pulse being configured to cause the laser pulse to generate an optical filament defining a desired electrical discharge path in the water, wherein the optical filament forms a laser-ionized conductive channel through the water along the desired electrical discharge path; and using the external power supply, producing a driving electric field which generates an electrical discharge at time t2>t1;

wherein the optical filament is configured to guide the electrical discharge through the laser-ionized channel along the desired electrical discharge path defined by the optical filament.

2. The method according to claim 1, wherein the laser pulse is fired towards an object in the water, the water providing a return current path for the electrical discharge.

3. The method according to claim 1, wherein the laser pulse is fired toward a second electrode in the water, a path between the first and second electrodes defining the desired electrical discharge path.

4. The method according to claim 1, further comprising splitting the beam produced by the laser pulse into a plurality of beams in a desired spatial pattern, each of the plurality of beams generating a corresponding optical filament in the water, each optical filament generating a corresponding laser-ionized channel;
wherein the driving electrical field from the external power supply generates a plurality of electrical discharges, each traveling along one of the plurality of laser-ionized channels.

5. The method according to claim 4, wherein the beam is split into the desired spatial pattern by means of a mask placed in front of the beam to guide the electrical discharge into a desired pattern of discharge paths.

6. The method according to claim 1, further comprising firing a plurality of laser pulses into the water, each of the plurality of laser pulses being configured to produce a corresponding optical filament in the water, each of the optical filaments forming a corresponding laser-ionized channel in the water;
wherein the driving electrical field from the external power supply generates a plurality of electrical discharges, each traveling along one of the plurality of laser-ionized channels along a corresponding desired electrical discharge path defined by the corresponding optical filament.

7. A method for producing a laser-guided underwater electrical discharge, comprising:
at time t1, firing a laser pulse having a power P greater than a critical power $P_{crit}$ past a first electrode in a body of water, the electrode being connected to an external power supply,
the power P and a focusing of the laser pulse being configured to cause the laser pulse to generate an optical filament defining a desired electrical discharge path in the water, the power P of the laser pulse further being configured to cause the optical filament to heat a water column coincident with the optical filament and to cause the water column to vaporize and expand at time t2>t1 to form a vapor column around the optical filament, the vapor column having a greater conductivity than the water surrounding the vapor column; and
using the external power supply, producing a driving electric field which generates an electrical discharge at time t3>t2;
wherein the optical filament is configured to guide the electrical discharge through the vapor column along the desired electrical discharge path defined by the optical filament.

8. The method according to claim 7, wherein the laser pulse is fired towards an object in the water, the water providing a return current path for the electrical discharge.

9. The method according to claim 7, wherein the laser pulse is fired toward a second electrode in the water, a path between the first and second electrodes defining the desired electrical discharge path.

10. The method according to claim 7, further comprising splitting the beam produced by the laser pulse into a plurality of beams in a desired spatial pattern, each of the plurality of beams generating a corresponding optical filament in the water, each optical filament generating a corresponding vapor column surrounding the optical filament; and
wherein the driving electrical field from the external power supply generates a plurality of electrical discharges, each traveling along a corresponding desired electrical discharge path through one of the vapor columns.

11. The method according to claim 10, wherein the beam is split into the desired spatial pattern by means of a mask placed in front of the beam to guide the electrical discharge into a desired pattern of discharge paths.

12. The method according to claim 7, further comprising firing a plurality of laser pulses into the water, each of the plurality of laser pulses being configured to produce a corresponding optical filament in the water, each of the optical filaments forming a corresponding vapor column in the water;
wherein the driving electrical field from the external power supply generates a plurality of electrical discharges, each traveling through one of the plurality of vapor columns along a corresponding desired electrical discharge path defined by the corresponding optical filament.

13. A method for producing a laser-guided underwater electrical discharge, comprising:
at time t1, firing a first laser pulse having a power $P_1$ greater than a critical power $P_{crit}$ (liquid water) past a first electrode in a body of water, the electrode being connected to an external power supply,
the power $P_1$ and a focusing of the first laser pulse being configured to cause the first laser pulse to generate a first optical filament in the water, the power $P_1$ of the first laser pulse being further configured to cause the optical filament to heat a water column coincident with the first optical filament and to cause the water column to vaporize and expand at time t2>t1 to form a vapor column surrounding the first optical filament;
at time t3>t2, firing a second laser pulse having a power $P_2$ greater than a critical power level $P_{crit}$(water vapor) through the vapor column, the power $P_2$ and a focusing of the second laser pulse being configured to cause the second laser pulse to generate a second optical filament defining a desired electrical discharge path within the vapor column, wherein the second optical filament forms a laser-ionized conductive channel through the vapor column along the desired electrical discharge path; and
using the external power supply, producing a driving electric field which generates an electrical discharge at time t4>t3;
wherein the second optical filament is configured to guide the electrical discharge through the laser-ionized channel along the desired electrical discharge path defined by the second optical filament.

14. The method according to claim 13, wherein the laser pulse is fired towards an object in the water, the water providing a return current path for the electrical discharge.

15. The method according to claim 13, wherein the laser pulse is fired toward a second electrode in the water, a path between the first and second electrodes defining the desired electrical discharge path.

16. A method for producing a laser-guided electrical discharge in a liquid, comprising:
at time t1, firing a laser pulse having a power P greater than a critical power $P_{crit}$ past a first electrode in a liquid, the electrode being connected to an external power supply,
the power P and a focusing of the laser pulse being configured to cause the laser pulse to generate an optical filament defining a desired electrical discharge path in the liquid, wherein the optical filament forms a laser-ionized channel through the liquid along the desired electrical discharge path, the laser-ionized channel having a greater conductivity than the surrounding liquid; and using the external power supply, producing a driving electric field which generates an electrical discharge at time t2>t1;

wherein the optical filament is configured to guide the electrical discharge through the laser-ionized channel along the desired electrical discharge path defined by the optical filament.

17. A method for producing a laser-guided electrical discharge in a liquid, comprising:

at time t1, firing a laser pulse having a power P greater than a critical power level $P_{crit}$ past a first electrode in a liquid, the electrode being connected to an external power supply, the power P and a focusing of the laser pulse being configured to cause the laser pulse to generate an optical filament defining a desired electrical discharge path in the liquid, the power P of the laser pulse further being configured to cause the optical filament to heat a liquid column coincident with the optical filament, and to cause the liquid column to vaporize and expand at time t2>t1 to form a vapor column around the optical filament, the vapor column having a higher conductivity than the surrounding liquid; and using the external power supply, producing a driving electric field which generates an electrical discharge at time t3>t2;

wherein the optical filament is configured to guide the electrical discharge through the vapor column along the desired electrical discharge path defined by the optical filament.

18. A method for producing a laser-guided electrical discharge in a liquid, comprising:

at time t1, firing a first laser pulse having a power $P_1$ greater than a critical power $P_{crit}$(liquid) past a first electrode in a liquid, the electrode being connected to an external power supply, the power $P_1$ and a focusing of the first laser pulse being configured to cause the first laser pulse to generate a first optical filament in the water, the power $P_1$ of the first laser pulse being further configured to cause the optical filament to heat a liquid column coincident with the first optical filament, and to cause the liquid column to vaporize and expand at time t2>t1 to form a vapor column surrounding the first optical filament;

at time t3>t2, firing a second laser pulse having a power $P_2$ greater than a critical power level $P_{crit}$(vapor) through the vapor column, the power $P_2$ and a focusing of the second laser pulse being configured to cause the second laser pulse to generate a second optical filament, the second optical filament defining a desired electrical discharge path within the vapor column, wherein the second optical filament forms a laser-ionized conductive channel through the vapor column along the desired electrical discharge path; and using the external power supply, producing a driving electric field which generates an electrical discharge at time t4>t3;

wherein the second optical filament is configured to guide the electrical discharge through the conductive channel along the desired electrical discharge path defined by the second optical filament.

* * * * *